May 19, 1953     P. L. FRANCK     2,639,339
COMBINATION DIMMER AND DIRECTION SWITCH
Filed April 13, 1951
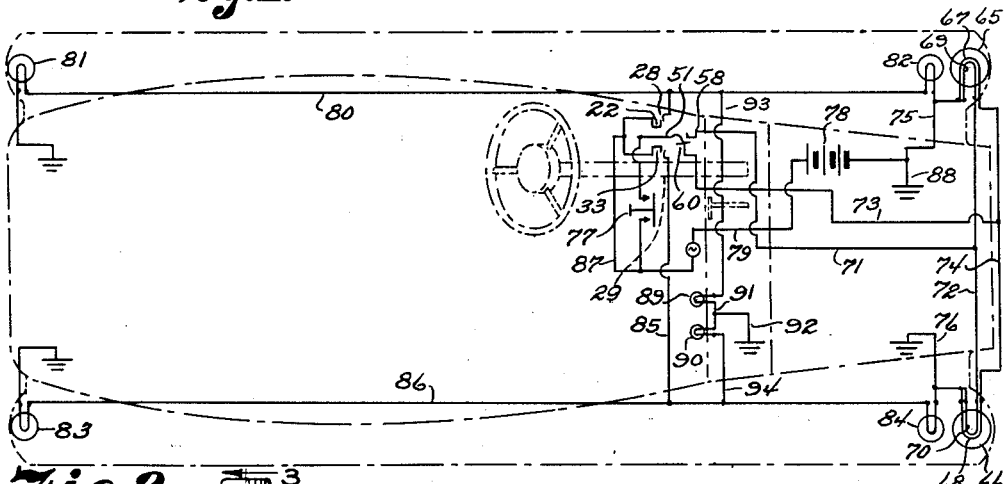
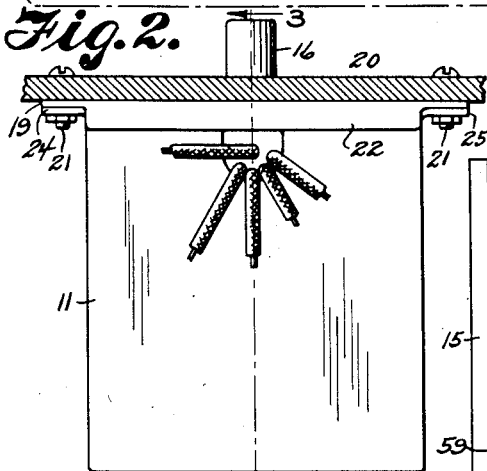
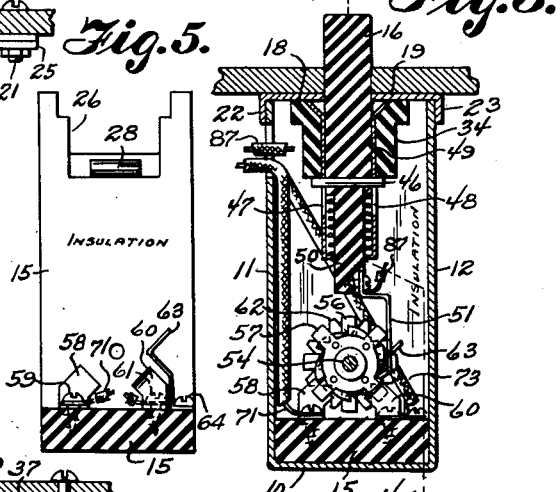
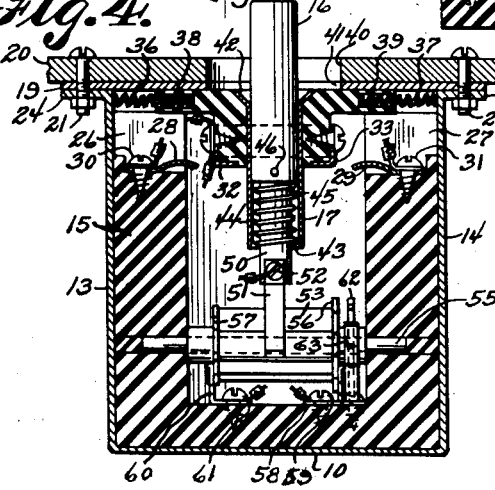
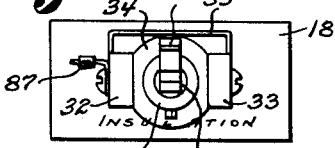
INVENTOR.
Paul L. Franck
BY Victor J. Evans & Co.
ATTORNEYS

Patented May 19, 1953

2,639,339

UNITED STATES PATENT OFFICE 2,639,339

COMBINATION DIMMER AND DIRECTION SWITCH

Paul L. Franck, Washington, D. C.

Application April 13, 1951, Serial No. 220,791

3 Claims. (Cl. 200—14)

This invention relates to headlight dimming and signal actuating switches of motor vehicles, and in particular a switch having a button adapted to be positioned in the floor of a motor vehicle corresponding to the conventional dimmer button or plunger and in which the button is movable laterally to light signals indicating that the operator of the vehicle contemplates turning to the right or left.

The purpose of this invention is to provide means for combining direction signals of a motor vehicle with the headlight dimmer switch of the vehicle whereby the direction signals may be actuated by a foot of the operator of the vehicle.

This invention is an improvement over the switch of my prior Patent No. 2,456,498 in that a lateral movement is provided for the button wherein the switch also operates direction signals.

Various types of direction signals have been provided on motor vehicles, but the type that operates with the turning of the steering wheel has not been found satisfactory and, at times, it is difficult to use one hand to operate a switch for the signal lights positioned on the instrument board of the vehicle. With this thought in mind this invention contemplates a foot actuated switch positioned in the floor of the vehicle whereby a button of the switch is pressed inwardly to actuate the dim and bright lights, and moved laterally to operate direction signal lights on the vehicle.

The object of this invention is, therefore, to provide means for incorporating direction signal control elements in a conventional dimmer switch whereby the direction signals are operated by the same button that actuates the dimmer switch.

Another object of the invention is to provide means for actuating direction signals of a motor vehicle by the foot of the operator without adding an additional switch to the vehicle.

A further object of the invention is to provide a combination dimmer light and direction signal operating switch for motor vehicles, which is of a simple and economical construction.

With these and other objects and advantages in view the invention embodies a casing having contacts mounted on a block of insulating material therein, means in the casing for opening and closing the contacts and a button vertically positioned and slidably mounted in a laterally slidable carrier for actuating the contact opening and closing means.

Other features and advantages of the invention will appear from the following description taken in connection with the drawings wherein:

Figure 1 is a view showing a wiring diagram illustrating the relative positions of the wires and lights to which the wires extend on a motor vehicle, a plan view of the vehicle being indicated in dot and dash lines, therein.

Figure 2 is a side elevational view of the switch.

Figure 3 is a cross section through the switch taken on line 3—3 of Figure 2.

Figure 4 is a longitudinal section through the switch taken on line 4—4 of Figure 3.

Figure 5 is a cross section similar to that shown in Figure 3 showing only the mounting block, which is formed of insulating material, with contacts mounted on the block and with other parts omitted.

Figure 6 is a view looking upwardly toward the under surface of the slidably mounted button carrier also showing the contacts on the carrier and with other parts omitted.

Referring now to the drawings wherein like reference characters denote corresponding parts the improved combination dimmer and direction signal switch of this invention includes a rectangular shaped casing having a base 10 with upwardly extended side walls 11 and 12 and with end walls 13 and 14, a U-shaped block 15 of insulating material, a button 16 slidably mounted in a tubular casing 17 and positioned in a carrier 18 which is formed of insulating material and which is adapted to be moved longitudinally in the casing by the button, and a cover plate 19 which, with the casing, is secured to a floor 20 by bolts 21.

The cover plate 19 is provided with flanges 22 and 23 at the sides which extend over the upper edges of the side walls 11 and 12 of the casing and the end walls 13 and 14 of the casing are provided with flanges 24 and 25 that are positioned to receive the bolts 21.

The upper ends of the side members of the block 15 are provided with slots 26 and 27 in which contacts 28 and 29 are secured by screws 30 and 31, respectively. The contacts 28 and 29 are positioned to be engaged by contacts 32 and 33 on the hub 34 of the carrier 18, as shown in Figure 6. The contacts 32 and 33 are connected with a contact strip 35.

The upper ends of the side members of the block 15 are spaced from the upper end of the casing providing slots in which the ends of the carrier 18 are slidably mounted and, as illustrated in Figure 4 the carrier, with the button 16 mounted therein is resiliently held in a central or neutral position by springs 36 and 37 that are positioned to extend into recesses 38 and 39 respectively, in the ends of the carrier.

The button 16 extends through an elongated slot 40 in the floor 20 and also through a similar slot 41 in the cover plate 19.

The tubular casing 17 in which the button 16 is mounted is provided with an outwardly flared outer end 42 and an annular flange 43 in the opposite end provides a seat for a spring 44 that urges the button outwardly, the opposite end of the spring engaging a shoulder 45 at the lower end of the button. Outward movement of the button is limited by a pin 46, as illustrated in Figure 3 which extends through slots 47 and 48 in the casing 17 and engages the end of the central portion or hub 49 of the carrier 18. The button is provided with a stem 50 of reduced diameter, and the stem extends through the spring and flange 43.

An offset arm 51, which is secured to the stem 50 of the button 16 by a screw 52 extends downwardly to engage elongated teeth 53 of a ratchet wheel 54 that is journaled by a shaft 55 in the ends of the block 15, as shown in Figure 4.

One end of the ratchet wheel is provided with a series of contacts 56 and the opposite end is provided with a series of alternately spaced contacts 57.

The contacts 56 are positioned to engage the contact 58 mounted, by a screw 59, on the base of the block 15, and the contacts 57 are positioned to engage a contact 60 which is mounted on the base of the block by a screw 61.

The ratchet wheel is also provided with a series of teeth 62 that are positioned to engage a spring arm 63 that is secured on the base of the block 15 by a screw 64. The spring arm 63 holds the ratchet wheel as the button 16 is returned by the spring 44.

With the switch positioned in the floor board of a motor vehicle the button 16 is pressed inwardly to actuate the switch to change from dim to bright lights or bright to dim lights and the button is moved laterally in the slot 40 to complete circuits to signal lights indicating that the vehicle is about to turn to the right or left.

In the diagram illustrated in Figure 1 headlights 65 and 66, provided with bright filaments 67 and 68 and dim filaments 69 and 70, respectively are connected to the contacts 58 and 60, the contact 58 being connected to the dim filaments 69 and 70 by wires 71 and 72 and the contact 60 being connected with the bright filaments 67 and 68 by wires 73 and 74. The opposite terminals of the filaments are grounded through wires 75 and 76.

With the parts as shown in Figure 1 the light switch 77 on the instrument panel is closed to light the bright lights when the contact arm 51, carried by the button 16 engages a contact 60 through one of the contact points 57, the opposite terminal of the switch 77 being connected to a battery 78 by a wire 79.

When it is desired to change to the dimmer lights the button 16 is pressed inwardly whereby one of the contact points 57 moves away from the contact 58. In this movement the circuit is broken to the bright lights and completed to the dim lights, and with the next movement of the button 16 the contacts are reversed with the circuit being broken to the dim lights and completed to the bright lights.

With the contacts of the dim and bright lights in either position the button 16 is moved laterally to complete circuits to the direction signal lights and with the button 16 moved in one direction the contact 22 engages the contact 28 completing a circuit through the wire 80 with the direction lights 81 and 82 on one side of the vehicle, and by moving the button 16 in the opposite direction the contact 33 engages the contact 29, completing a circuit to the direction signal lights 83 and 84 on the opposite side of the vehicle through the wires 85 and 86. The contacts 32 and 33 are connected to one side of the battery 78 by a wire 87 and the opposite terminal of the battery is connected to the ground 88. The opposite terminals of the signal lights for indicating the direction the vehicle is about to turn are also grounded.

The circuit is also provided with indicating lights 89 and 90, both of which are connected to a ground by the wires 91 and 92, and the light 89 is connected to the wire 80 of the signal lights 81 and 82 by a wire 93, and the light 90 is connected to the wire 86 of the lights 83 and 84 by a wire 94.

With the parts arranged in this manner the operator of a motor vehicle may operate the bright and dimmer lights in the conventional manner and may, at the same time press the foot button, for operating the dimmer switch, to the right or left to indicate the direction in which he intends to turn the vehicle. As soon as the button is released circuits to the direction signals are broken as the button is returned to the neutral position by the springs 36 and 37.

It will be understood that modifications may be made in the design and arrangement of the parts without departing from the spirit of the invention.

What is claimed is:

1. A combination motor vehicle dimmer and direction signal switch comprising a switch casing, a block of insulating material U-shape is cross section positioned in the casing, a carrier slidably mounted for lateral travel on one end of the casing, contacts positioned on the sides of the carrier, a button slidably mounted in the carrier and positioned to extend into an open area in the block of insulating material, a ratchet wheel having a series of contacts thereon journaled in the said block of insulating material and positioned perpendicular to the axis of said button, means actuating the ratchet wheel by the button as the button is pressed inwardly, contacts positioned to be engaged by the said series of contacts of the ratchet wheel for making and breaking circuits, and contacts mounted on the said block of insulating material and positioned to be engaged by the contacts of the carrier upon lateral movement of the carrier.

2. A combination motor vehicle dimmer and direction signal switch comprising a switch casing, a block of insulating material U-shape in cross section position in the casing, a carrier slidably mounted for lateral travel on one side of the casing, contacts positioned on the sides of the carrier, a button slidably mounted in the carrier and positioned to extend into an open area in the block of insulating material, a ratchet wheel having a series of contacts thereon journaled in the said block of insulating material and positioned perpendicular to the axis of said button, means actuating the ratchet wheel by the button as the button is pressed inwardly, contacts positioned to be engaged by the said series of contacts of the ratchet wheel for making and breaking circuit, contacts mounted on the said block of said insulating material and positioned to be engaged by the contacts of the carrier upon lateral movement of the carrier, resilient means in the carrier for returning the button to its released position, and resilient means in the casing for returning the carrier to a neutral position.

3. In a combination motor vehicle dimmer and direction signal switch, the combination which comprises a casing rectangular shaped in cross section having an open upper end and having flanges extended from the said upper ends, a plate having an elongated slot therein positioned on the upper open end of the casing and secured to said flanges, a block of insulating material U-shaped in cross section having a base with upwardly extended arms positioned in said casing, a carrier, also of insulating material, slidably mounted on said plate and having a vertically disposed bore therein, springs mounted in the casing and positioned to engage opposite ends of the carrier for urging the carrier to a centrally disposed neutral position, a button slidably mounted in the bore of the carrier and having an arm carried by the end thereof extended into the casing, said arm positioned in the open area between the arms of said insulating block, contacts carried by opposite ends of the carrier and positioned to travel over the upper ends of the arms of the block of insulating material, contacts mounted on the ends of the arms and positioned to engage said contacts of the carrier, a ratchet wheel positioned in the open area between the arms of the block of insulating material and mounted on a shaft journaled in said arms, radially disposed contacts carried by one end of the ratchet wheel, contacts on the base of the block of insulating material positioned to be engaged by the radially disposed contacts of the ratchet wheel, said ratchet wheel positioned to be engaged by the arm extended from the button for rotating the ratchet wheel as the button is pressed inwardly of the casing, and resilient means for retaining said ratchet wheel in adjusted positions.

PAUL L. FRANCK.

References Cited in the file of this patent

UNITED STATES PATENTS

| Number | Name | Date |
| --- | --- | --- |
| 1,893,371 | Knowlton | Jan. 3, 1933 |
| 2,305,962 | Gould | Dec. 22, 1942 |
| 2,373,889 | Harmon | Apr. 17, 1945 |
| 2,453,035 | Ponsy | Nov. 2, 1948 |